United States Patent
Fuglsang-Petersen et al.

(10) Patent No.: US 10,774,816 B2
(45) Date of Patent: Sep. 15, 2020

(54) SYSTEM AND METHOD FOR MONITORING A FLANGE CONNECTION OF A WIND TURBINE

(71) Applicant: Senvion GmbH, Hamburg (DE)

(72) Inventors: Jochen Fuglsang-Petersen, Aukrug (DE); Christoph Nack, Büdelsdorf (DE)

(73) Assignee: Senvion GmbH, Hamburg (DE)

(*) Notice: Subject to any disclaimer, the term of this patent is extended or adjusted under 35 U.S.C. 154(b) by 73 days.

(21) Appl. No.: 16/135,605

(22) Filed: Sep. 19, 2018

(65) Prior Publication Data
US 2019/0085826 A1 Mar. 21, 2019

(30) Foreign Application Priority Data
Sep. 20, 2017 (DE) .................. 10 2017 008 782

(51) Int. Cl.
*G01M 5/00* (2006.01)
*F03D 17/00* (2016.01)
*F03D 1/06* (2006.01)

(52) U.S. Cl.
CPC .......... *F03D 17/00* (2016.05); *F03D 1/0658* (2013.01); *G01M 5/0033* (2013.01); *F05B 2260/301* (2013.01); *F05B 2260/80* (2013.01)

(58) Field of Classification Search
CPC .... F03D 17/00; F03D 1/0658; G01M 5/0033; F05B 2260/301; F05B 2260/80
USPC ........................................................ 73/761
See application file for complete search history.

(56) References Cited

U.S. PATENT DOCUMENTS

| | | | | |
|---|---|---|---|---|
| 5,717,143 A | * | 2/1998 | Jenco .................. | G01L 5/24 73/761 |
| 7,438,603 B1 | * | 10/2008 | Lewis .................. | G01R 1/0416 439/709 |
| 2007/0193361 A1 | * | 8/2007 | Coffey .................. | G01L 5/243 73/780 |

(Continued)

FOREIGN PATENT DOCUMENTS

| CN | 201812361 U | 4/2011 |
|---|---|---|
| DE | 102013218845 A1 | 3/2015 |

(Continued)

OTHER PUBLICATIONS

Extended European search report dated Mar. 13, 2019 for the corresponding European Patent Application No. 18 194 966.0.

*Primary Examiner* — Max H Noori
(74) *Attorney, Agent, or Firm* — Rankin, Hill & Clark LLP (57) ABSTRACT

The invention relates to a system and a method for monitoring a flange connection of a wind turbine, and to a corresponding wind turbine. According to the invention, one or more monitoring bodies (90) are mounted on one or more bolt nuts (20) and/or bolt heads of at least one flange connection of a wind turbine, and a circuit of the monitoring bodies (90) is produced with connecting cables (100) such that, upon rotation of a slackening bolt nut (20) or of a bolt head of a slackening bolt and of the monitoring body (90) mounted thereon, at least one connecting cable (100) connected to the concomitantly rotating monitoring body (90) becomes detached, owing to increasing tensile stress on the connecting cable (100), a fault in the flange connection being signaled upon slackening of a bolt nut (20) or bolt.

15 Claims, 4 Drawing Sheets

(56) References Cited

U.S. PATENT DOCUMENTS

2011/0131898 A1* 6/2011 Nies ...................... E04H 12/085
                                                                             52/173.1
2012/0321471 A1* 12/2012 Grabau ................ F03D 7/0228
                                                                             416/147
2017/0022978 A1* 1/2017 Li ........................... F03D 17/00

FOREIGN PATENT DOCUMENTS

| DE | 102015212906 A1 | 1/2017 |
| GB | 2463081 A | 3/2010 |

\* cited by examiner

SYSTEM AND METHOD FOR MONITORING A FLANGE CONNECTION OF A WIND TURBINE

PRIORITY CLAIM

This application claims priority to DE 10 2017 008 782.2, filed Sep. 20, 2017, which is hereby incorporated by reference in its entirety.

BACKGROUND OF INVENTION

Field of Invention

The invention relates to a system and a method for monitoring a flange connection, in particular subjected to high dynamic loading, of a wind turbine. The invention additionally relates to a wind turbine.

Brief Description of Related Art

Wind turbines are machines subjected to high levels of dynamic loading, with stress cycles of $10^9$ load alternations that otherwise occur only very infrequently in machine construction. These dynamics result in a very high degree of material fatigue. For logistical reasons, however, the main components of a wind turbine can only be assembled on the construction site. This means that the entire loads from the wind rotor must be transmitted via separable connections, usually flange connections having threaded bolts. The flange connections that are subjected to high loading comprise the tower flanges, the tower head bearing, the supports for the shaft and gearbox, the connection of the rotor shaft and rotor hub, and the connection of the rotor blades to the rotor hub via the blade bearings. These flange connections have unavoidable weak points, in the form of bolt holes.

For example, the fastenings of the rotor blades to the rotor hub, at the blade root end, are constituted by the rotor-blade bearings. When the wind turbine is in operation, these components are subjected to high levels of loading, and in the event of being damaged can cause serious problems, to the extent of rotor-blade shedding.

A typical structural design of rotor-blade bearings has two bearing rings that are rotatably connected to each other via rolling elements and that are each provided with drilled holes for receiving connection bolts, or rotor-blade assembling bolts. At the same time, these drilled holes are weak points of the rotor-blade bearings.

Owing to their lack of accessibility, inspection of rotor-blade bearings is particularly demanding of resources, and only possible to a limited extent. Cracks in the rotor-blade bearing can therefore only be ascertained with difficulty, if at all, before they cause a failure of the rotor-blade bearing. The same also applies to other flange connections of wind turbines.

In relation to this, known from the German patent application of the applicant, published under the number DE 10 2013 218 845 A1, are an apparatus and a method for monitoring a flange connection, subjected to high dynamic loading, of a wind turbine. The apparatus comprises a monitoring body that can be mounted in positive-locking and/or non-positive locking contact on a bolt head or a bolt nut of a bolt, and that has a central receiver for the bolt head or the bolt nut. The monitoring body is a type of "nut cap", and is designed to be damaged in the event of damage to or destruction of a bolt head or bolt nut arranged in the central receiver. Arranged on the monitoring body is a sensor, which is designed to ascertain a structural integrity of the monitoring body.

As a result of the monitoring by means of the "nut cap", it is possible to initiate an automatic switch-off of the wind turbine if a critical bearing crack occurs that, in the case of the rotor-blade bearing, could in the worst case result in shedding of the blade. In this case, cracked bolt nuts or bolt heads are used as indicators for cracks in the flange connection, or in the bearing. A crack in the rotor-blade bearing has the result, for example, that, in the case of a bearing crack, the rotor-blade bolt and the nut fixedly screwed thereon are disproportionately subjected to loading, and this results in a crack in the blade nut or possibly in a bolt head. It may also happen that the blade nut is touched by the rotor bolt. The same also applies to other failing flange connections of wind turbines. This monitoring option is used, as Senvion CMBB condition monitoring, in wind turbines.

The present invention, in contrast, is based on the object of improving the monitoring of flange connections of a wind turbine.

BRIEF SUMMARY OF THE INVENTION

This object is achieved by a system for monitoring a flange connection of a wind turbine, comprising a flange connection having a plurality of bolts that are arranged adjacently to each other in openings of a flange and that are fastened with bolt nuts and/or bolt heads, and a plurality of monitoring bodies, which are mounted in positive-locking and/or non-positive locking contact on bolt nuts and/or bolt heads of a plurality of bolts, in particular adjacent to each other, the monitoring bodies being connected to each other, via connecting cables, to form a circuit, in particular a series circuit, which system is enhanced in that the arrangement of the monitoring bodies on the bolt nuts and/or bolt heads and the length of the connecting cables are selected such that, upon rotation of a slackening bolt nut or of a bolt head of a slackening bolt and of the monitoring body mounted thereon, at least one connecting cable connected to the concomitantly rotating monitoring body becomes detached, owing to increasing tensile stress on the connecting cable, in particular upon a tensile stress limit value being exceeded. According to the invention, the detaching of the connecting cable causes a fault message to be triggered in a control or monitoring device connected to the circuit.

It is thereby ensured that a loss of tensioning of individual bolts of a flange connection subjected to high loading is discovered at an early stage before failure of the entire flange connection can occur. In the case of wind turbines, losses of tensioning in such flange connections occur sporadically, and may be due both to application faults such as, for example, faulty mounting or a faulty tensioning procedure, and to material faults or design faults, for instance due to design-related overload.

Moreover, it is ensured that crack formation in a flange connection, in particular subjected to high dynamic loading, does not remain undiscovered because of slackening of individual bolts and/or bolt nuts. Occasionally, blade bearing screwed connections may slacken because of errors in assembly and maintenance, undefined lubrication states, or also borderline structural design of the flange connections. In the case of use of the previous system, a lack of tensioning or insufficient tensioning of the screwed connection constitutes a risk for the reliable detection of, inter alia, blade bearing cracks, since in the case of crack formation slackened bolts or bolt nuts are not subjected to the deformation force of the cracking flange in the same way as are properly fastened bolts or bolt nuts. A crack could thus propagate without being detected.

The system relates both to flange connections having stud bolts that are secured with bolt nuts, and to flange connections having threaded bolts that are screwed into a flange hole having a matching internal thread. Stud bolt connections have at least one bolt nut per stud bolt, threaded bolts having a bolt head and possibly a bolt nut, the latter in the case of a through-hole screwed connection.

The system according to the present invention counteracts an unnoticed loss of tensioning in that it is now designed, with respect to the positioning of the monitoring bodies on the bolt heads or bolt nuts, and to the cabling between the adjacent monitoring bodies, such that a slackening of a bolt or bolt nut on a bolt of the flange is identified in that the cabling to at least one adjacent bolt is disconnected. A flow of current or a conductive connection in the system is thereby broken, resulting in a signal that indicates the corresponding occurrence. In the simplest case, this is effected by means of a series circuit, but also in the case of a parallel circuit, for example, a sudden change in current, caused by a disconnected cabling, can be identified by means of an electronic circuit.

Since bolt nuts on bolts, or bolts per se, are usually tightened by being rotated clockwise, and slackening means a rotation in the counter-clockwise direction, in the case of slackening of the bolts or bolt nuts the direction of rotation of the same is also well defined, such that the geometric arrangement and cabling between the monitoring bodies can be selected accordingly.

In an advantageous development, the monitoring bodies are realized such that, in the event of damage to or destruction of a bolt nut or bolt head, the monitoring body mounted on the bolt nut or on the bolt head is also damaged, the monitoring bodies each having a sensor that is designed to ascertain a structural integrity of the monitoring body, the connecting cables between the monitoring bodies interconnecting the sensors on the monitoring bodies. This measure extends the monitoring of the flange connection, by making it possible to detect destroyed bolts or bolt nuts at an early stage, and thus to put the affected wind turbine into a safe installation state, in particular to shut it down. For this purpose, the monitoring bodies are expanded in each case by a sensor, for example a cable that goes around the monitoring body and that is disconnected in the event of the monitoring body being destroyed. The series circuit of the monitoring bodies is thus expanded to a series circuit of the sensors on the monitoring bodies, such that both the destruction of bolts, bolt heads or bolt nuts, and the slackening of the same, is monitored.

During installation, it must be ensured that usual vibrations during the operation of the wind turbine do not result in a detachment of the cabling, while even a relatively slight slackening of the bolt or bolt nut does result in a detachment. Following proper installation, therefore, the cabling should not have any tensile stress on the connecting cables. Preferably, the connecting cables are thus installed without tensile force, as long as no bolt nut or bolt slackens. On the other hand, it is advantageously provided that a rotation of 70°, in particular 40°, in particular preferably 15°, of a slackening bolt nut or bolt head of a slackening bolt, relative to an initial position of the bolt nut or bolt head, is not exceeded before the connecting cable becomes detached. It is thereby ensured that there is no decrease in the tensioning force of the bolt connection that has the effect that a crack in the flange would no longer be detectable.

In an advantageous embodiment, the connecting cables are provided with a predetermined rupture point. Such a predetermined rupture point may be designed such that it yields upon a defined tensile force. As an alternative or in addition to this, for example as an additional safeguard, the connecting cables advantageously can be connected, or are connected, by means of plug-and-socket connectors in the connecting cables or on the sensors, which plug-and-socket connectors separate as axial tensile stress increases. For this purpose, in advantageous designs, the plug-and-socket connectors have key-and-slot connections or magnetic connections that separate, in particular non-destructively, upon a tensile stress limit value being exceeded.

A particularly high reliability of detection is advantageously achieved if, upon a rotation of a slackening bolt nut or bolt head of a slackening bolt, the connecting cables of the concomitantly rotating monitoring body and/or sensor to two adjacent monitoring bodies and/or sensors become detached, which connecting cables are arranged in a circuit, in particular series circuit, of the monitoring bodies and/or sensors before and after the concomitantly rotating monitoring body and/or sensor. In the context of the invention this means that, in the case of a monitoring body, with or without a sensor on a bolt nut or bolt head, that is interconnected to monitoring bodies with or without sensors on two adjacent bolt nuts or bolt heads, the monitoring bodies, or sensors, are connected to each other by cable in such a manner that, in the event of slackening of the bolt nut, or bolt, the cabling to both sides becomes detached. Owing to the geometric relationships, however, it may be the case that this solution is not effected simultaneously but that, for example, one connecting cable becomes detached upon a rotation of 15°, and a second connecting cable becomes detached upon a rotation of 25° of the slackening of the middle bolt nut, or middle bolt.

Advantageously, the connecting cables are made up to a cable length that is somewhat longer than a least favorable case in the case of a 60° contact spacing, in particular a 30° contact spacing, of the monitoring body for mounting on a bolt head or bolt nut, in particular a hexagonal nut or a hexagonal bolt head. In this case, however, the available play is preferably to be selected such that a connection between adjacent monitoring bodies is no longer possible if the next stop position of the 60° contact spacing or 30° contact spacing on the bolt head or bolt nut were occupied.

Since bolt nuts are usually realized as hexagonal nuts, which are in a non-predefined positional relationship to each other in a flange in the fastened state, the length of the connecting cables must be such that even the least favorable case of a maximum possible distance between the connections of two sensors can be bridged without tensile stress on the connecting cable between these two sensors. If the monitoring body is likewise realized as a precise-fit hexagon, an angular range of 60° is obtained, in which the connections of the respective sensor can be located, in the case of an otherwise regular arrangement of the sensors on the adjacent bolt nuts. However, if the monitoring body has a 12-ray rotational symmetry instead of a 6-ray rotational symmetry, this angular range is only 30°. During installation, therefore, the positional relationship of adjacent sensors in relation to each other can be set with less play in relation to each other. In the context of the invention, this principle can also be applied with an even finer pitch in order to identify a loss of tensioning at an even earlier stage. Possibilities here, for example, are an 18-ray or 24-ray rotational symmetry, which are then associated with angular ranges of 20° and 15°, respectively.

The object on which the present invention is based is also achieved by a wind turbine having a previously described system according to the invention for monitoring a flange connection. This wind turbine according to the invention combines the same properties, features and advantages as the system according to the invention, which accordingly is part of the wind turbine.

Further, the object on which the present invention is based is also achieved by a method for monitoring a flange connection of a wind turbine, one or more monitoring bodies, in a previously described system according to the invention, being mounted on one or more bolt nuts and/or bolt heads of at least one flange connection of a wind turbine, and a circuit, in particular a series circuit, of the monitoring bodies being produced by means of connecting cables such that, upon rotation of a slackening bolt nut or bolt head of a slackening bolt and of the monitoring body mounted thereon, at least one connecting cable connected to the concomitantly rotating monitoring body becomes detached, owing to increasing tensile stress on the connecting cable, a fault in the flange connection being signaled upon slackening of a bolt nut or bolt. The method according to the invention thus also combines the same features, advantages and properties as the system according to the invention.

Preferably, the structural integrity of the monitoring bodies is monitored by means of one or more sensors on the monitoring bodies, a fault in the flange connection being signaled in the event of damage to or destruction of one or more monitoring bodies.

Advantageously, upon signaling of damage to the flange connection, the wind turbine is shut down. This enables servicing, and if appropriate repair of the affected flange connection, to be performed promptly.

Preferably, a plurality of sensors are operated in series or grouped in groups, in particular also groups of series circuits are set up. The grouping of the monitoring bodies and/or sensors allows a rapid overview of which portion of a flange connection is affected by a slackening bolt nut, a slackening bolt or a crack.

In one embodiment of the method, it is provided that, in the event of damage to or destruction of a monitoring body, or separation of a connecting cable, a sensor emits a signal, or damage is ascertained if, in the case of monitoring, a sensor is not identified because of disconnection of its electrical conductor, or a continuously present signal is interrupted.

Further features of the invention are disclosed by the description of embodiments according to the invention, together with the claims and the appended drawings. Embodiments according to the invention may fulfill individual features or a combination of a plurality of features.

BRIEF DESCRIPTION OF THE DRAWINGS

The invention is described in the following, without limitation of the general concept of the invention, on the basis of exemplary embodiments and with reference to the drawings, express reference being made to the drawings in respect of all details according to the invention that are not explained more fully in the text. There are shown:

FIG. 2a)-2d) schematic representation of a monitoring body and sensor,

In the drawings, elements and/or parts that are the same or similar are in each case denoted by the same references, such that in each case they are not presented over again.

DETAILED DESCRIPTION OF THE INVENTION

Figure 1:
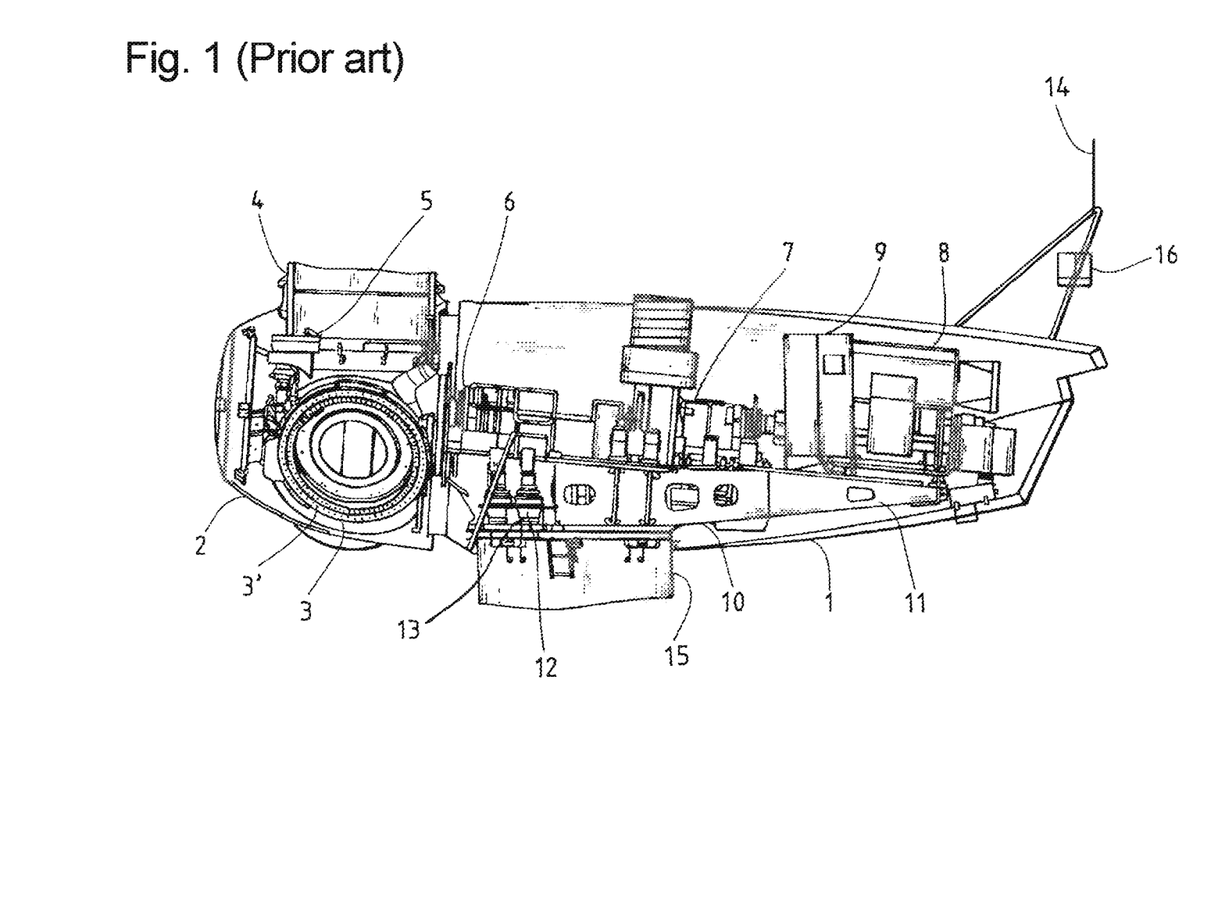
FIG. 1 a schematic representation of a nacelle of a wind turbine.

In FIG. 1 a nacelle 1 of a wind turbine is represented schematically from the side. Adjoining the nacelle 1 is a rotor hub 2, having three rotor-blade connections that have rotor-blade bearings for rotor blades 4. The blade-root end of a rotor blade 4 is also represented. The rotor-blade connections each have flanges for connecting a rotor blade 4, and blade pitch control devices for setting and fixing the rotor-blade pitch. A rotor-blade bearing that is mounted on the flange and covered with an enclosure is denoted by the reference 5. For the purpose of screw-connecting a rotor blade 4 to the rotor-blade bearing 3 the rotor-blade bearings 3 have a multiplicity of circumferential bores 3' for receiving threaded bolts, or rotor-blade bolts.

Adjoining the rotor hub 2 within the nacelle 1 is a bearing assembly 6 of a low-speed rotor shaft, which is directly connected to the rotor hub 2. The low-speed shaft is connected to a gearbox 7, by which the rotational speed of the low-speed rotor shaft is increased and transmitted to a high-speed shaft. The high-speed shaft, which adjoins the gearbox 7, leads to a generator 8 that is arranged at the rear end of the nacelle 1. Also represented is an electronic control device 9, having a converter that adapts the electric current generated by the generator 8 such that it can be fed into a private or public electricity grid.

Represented in the lower region of the nacelle 1 is a bedframe that has a mainframe 10 and a rear frame 11. The mainframe 10 supports the bearing assembly 6 of the low-speed shaft, as well as the rotor hub 2 and the gearbox 7. The rear frame 11 carries electrical components such as the generator 8, control and switch cabinets and, if appropriate, a transformer and the converter.

For the purpose of azimuthal rotation, i.e. for rotating the nacelle 1 on the longitudinal axis of the tower 15, arranged on the mainframe 10 are a plurality of yaw drives 12, usually between four and sixteen, which rotate the nacelle 1 on the tower 15 via a gear wheel and ring gear transmission. Additionally realized adjacently thereto are yaw brakes 13, which relieve the load on the yaw drives 12. They hold the nacelle 1 in a fixed azimuthal position once a reference azimuthal position has been assumed. During an azimuthal adjustment they are subjected to a residual pressure, in order to decouple the yaw drives 12 from external influences.

At its rear end, the nacelle 1 additionally has wind sensors, for example an anemometer 16, and a lightning protector 14. A further lightning protector, not represented, is usually arranged between the nacelle 1 and the rotor hub 2, in order to deflect lightning strikes from the rotor blade 4 into the tower 15.

The invention is explained in the following figures on the basis of a rotor-blade bearing realized as a flange connection. These designs are easily transferable to very advantageous monitoring of a yaw bearing, arranged between the tower head and the nacelle, that in function and structure is very similar to a blade bearing.

Figure 2:
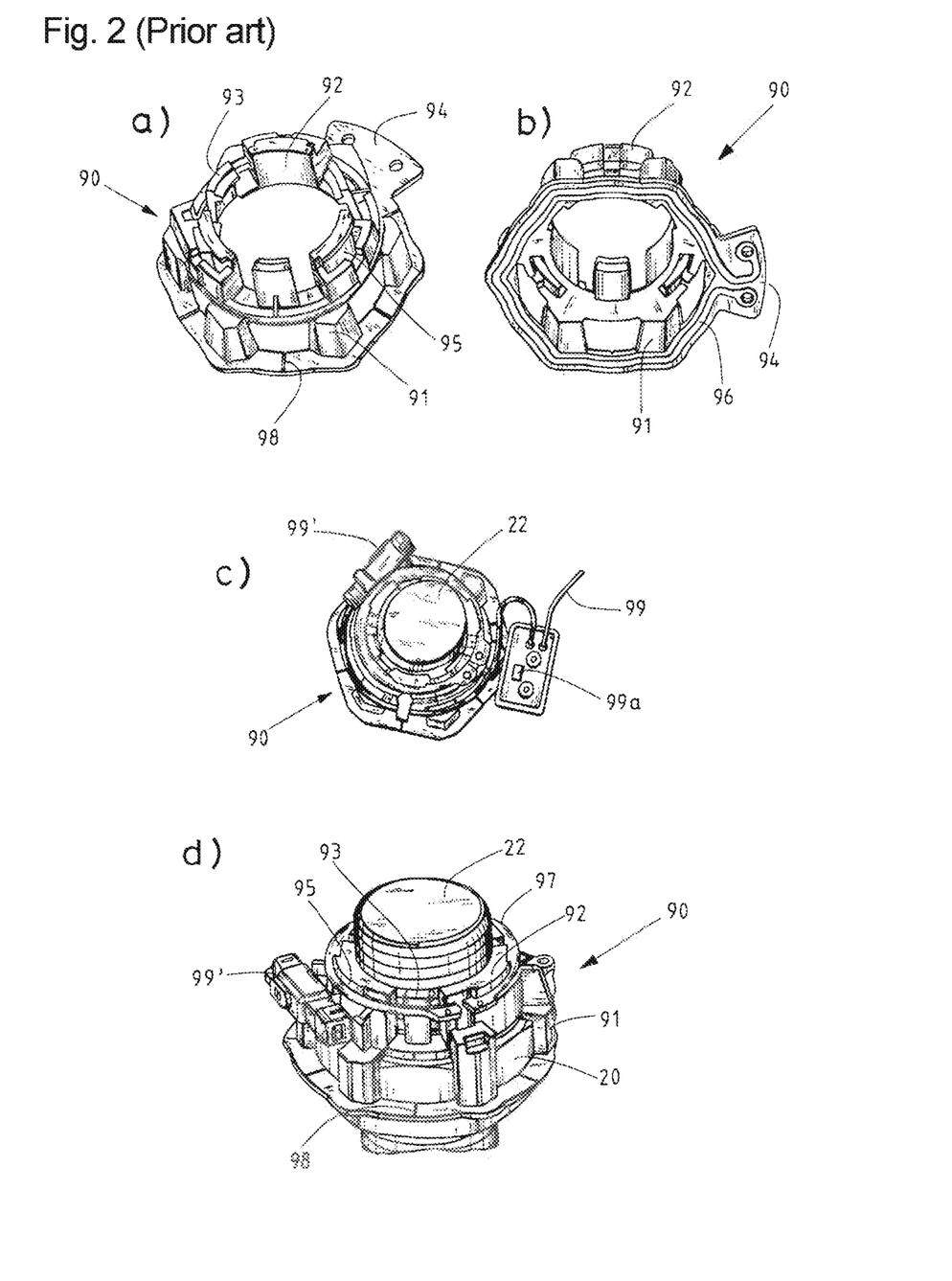

FIGS. 2a) to 2d) shows an exemplary embodiment of a device known from DE 10 2013 218 845 A1. FIGS. 2a) and 2b) show upper and lower schematic perspective representations of a nut attachment 91 of a monitoring body 90. In the lower region, the latter comprises a circumferential web, and predetermined rupture points 98 on the web. In the upper region the bolt receiving part 92 has a locking element 93, having an inwardly directed lug, and outwardly directed holding structures 95 for a snap ring. The nut attachment 91 has a mount 94 for contacting and printed circuit board. A coating of an electrical conductor 96 is represented on the underside of the web.

For the monitoring, according to the invention, of a loss of tensioning, in the simplest form a monitoring body without a conductor coating or sensor can be used. In this case, the monitoring body functions as a cable carrier for the connecting cables to the respectively adjacent bolts. The ends of the connecting cables are then conductively interconnected.

In addition, however, the additional monitoring of the loss of tensioning and of the structural integrity of the monitoring bodies renders possible reliable monitoring of the two main failure mechanisms of a screwed connection subjected to high dynamic loading.

FIGS. 2c) and 2d) show the monitoring body 90 on the bolt 22 and having a snap ring 97. Also represented are a connector plug 99' and a printed circuit board having a low-current LED 99a and a cabling 99. The LED 99a serves to locate damaged bolt nuts 20.

Figure 3:
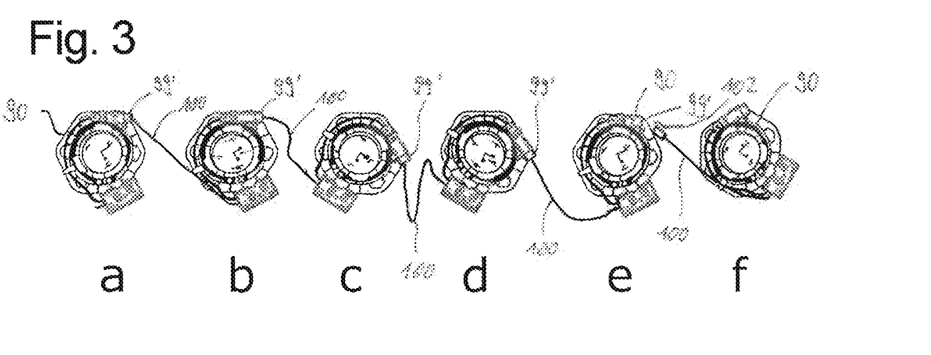
FIG. 3 an exemplary cabling of sensors.

In FIG. 3 an exemplary cabling of six adjacent nut caps, or monitoring bodies 90, is shown at positions a to f. The bolt positions are represented in a line. In most cases of application in wind turbines, the bolts are located on a hole circle having a predetermined radius, for example of between 1 and 4 m in length.

The bolt nuts are each located at different nut positions. Depending on the random nut position following the prescribed tensioning of the bolts, the monitoring bodies 90 in this case may in principle be placed on the hexagon nuts in respectively six different positions, which differ from each other by 60° in each case. For reasons of space, substantially uniform alignments of the sensors, or monitoring bodies 90, are preferred.

In FIG. 3, the extreme positions of adjacent nuts are represented in each case. Between the positions a and b the predetermined cable length of the connecting cable 100 is fully utilized. A slackening of the bolt nuts at position A or B would result in breakage of the connection. Between positions c and d there is a minimal distance, such that a loss of tensioning would be detected only after more than 60° of rotation of a bolt nut. The bolt nut at position f has slackened, and has thereby released the connector at the predetermined rupture point, such that here there is a connection interruption 102.

Figure 4:
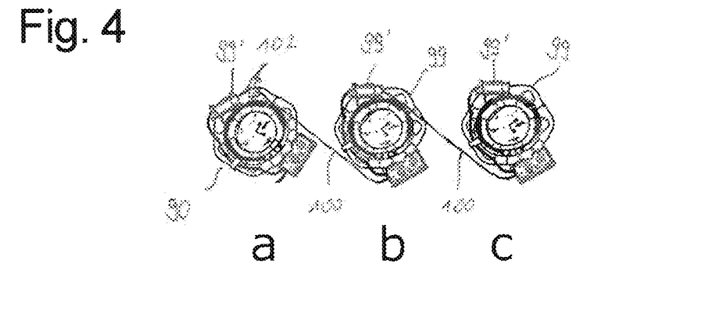
FIG. 4 a further exemplary cabling of sensors.

An alternative arrangement of the plug connectors 99' on the monitoring bodies 90 is shown in FIG. 4. In FIG. 4, a connection interruption 102 has already resulted from slackening of the bolt nut in position a. In this embodiment, the plug connector 99' is arranged with an offset of approximately 180° relative to the opposite cable connection (printed circuit board with LED), i.e. set back somewhat in comparison with FIG. 3. For the purpose of releasing the plug-in connections 99', an axial tensile loading is more advantageous than an oblique tensile loading as in FIG. 3. An oblique tensile loading entails an unfavorable cable tensile angle, which can have the result that the plug is possibly not released and, in the worst case, the connecting cable 100 lengthens. The monitoring body 90 and the connecting cable 100 would then have to be replaced because of overloading. This is avoided by the altered plug connector position as shown in FIG. 4.

Alternatively, a plug-in connection may also be arranged centrally between the monitoring bodies 90, which ensures that there is always an axial tension on the plug-in connection.

The situation is improved considerably yet again if the monitoring body 90 is equipped with twelve possible plug-in positions, since the maximum possible play to be taken into account in the making-up of the length of the connecting cables 100 is halved.

Figure 5:
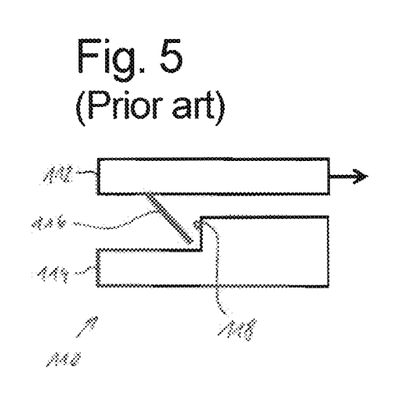
FIG. 5 a schematic representation of a known plug-and-socket connection.

Represented schematically in FIG. 5 is a conventional plug-in connection 110, in which a plug connector 112 is equipped with a key 116 that engages in a slot 118 of a socket 114. In this case, the plug connector 112 cannot be removed again from the socket 114 without destruction of the key 116. Moreover, it is also not possible to set a reproducible tensile force at which this plug-in connection 110 separates.

Figure 6:
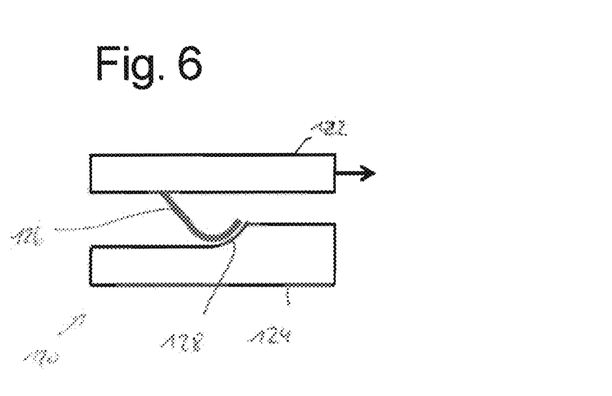
FIG. 6 a schematic representation of a plug-and-socket connection that can be used according to the invention, and FIG. 7a), 7b) a schematic representation of a magnetic plug-and-socket connection that can be used according to the invention.

By contrast, shown schematically in FIG. 6 is a plug-in connection 120, which is similar in structure to the plug-in connection 110, with the difference that in this case the key 126 of the plug connector 122 and the slot 128 of the socket 124 are rounded, such that, in the case of tensile loading, the key 126 can slide out of the slot 128, the tensile loading, symbolized by an arrow on the plug connector 122, at which the plug connector 122 separates from the socket 124 being very easily settable by means of the spring force of the key 126. Thus, if a bolt nut has slackened and the plug-in connection 120 has also separated as a consequence, the plug-in connection 120 can be restored, following re-tightening of the bolt connection, by simple insertion of the plug connector 122 into the box on 4 20.

Figure 7:
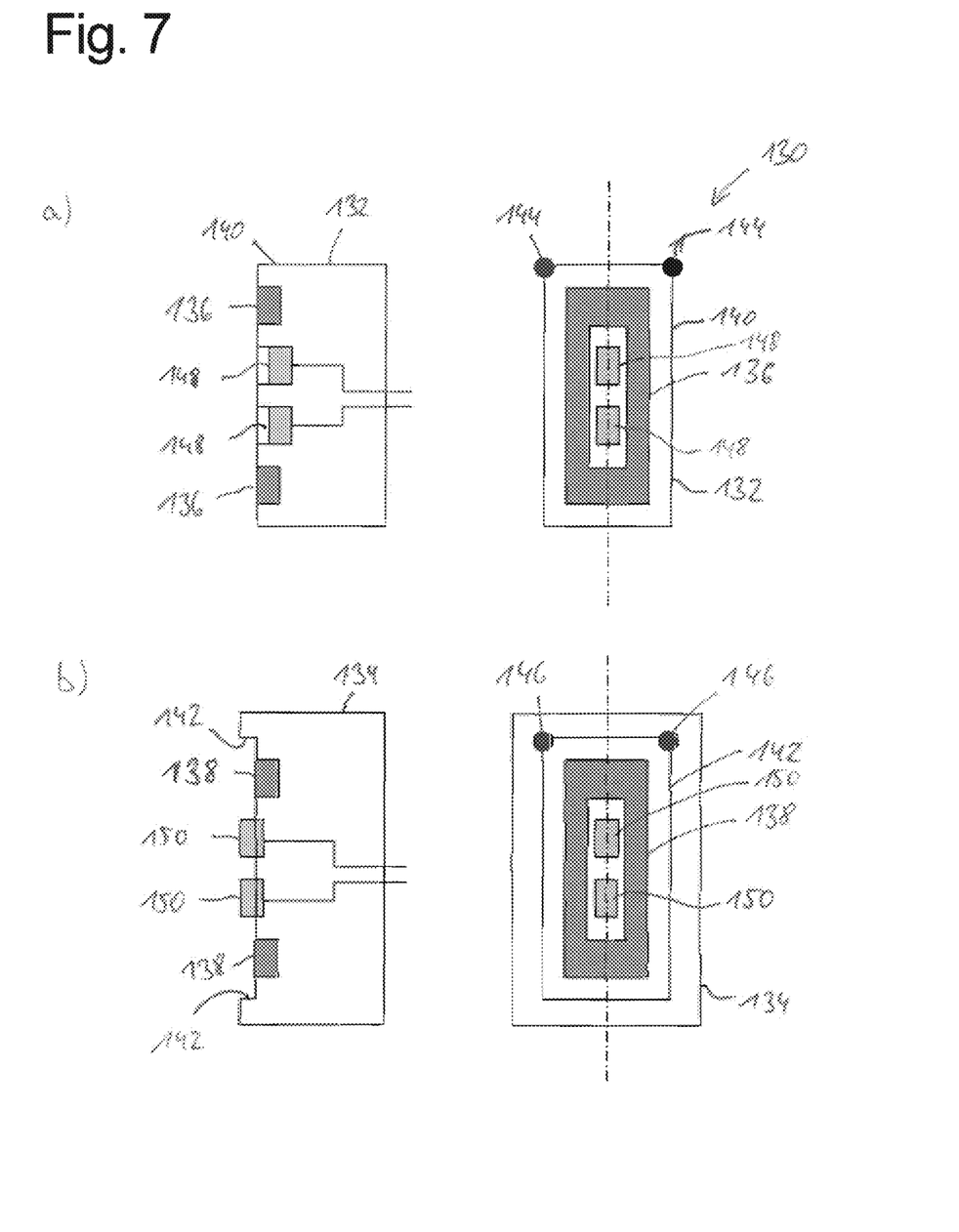

A magnetic plug-in connection 130 is represented schematically in FIG. 7, the plug connector 132 being represented in greater detail in FIG. 7a), and the socket 134 being represented in greater detail in FIG. 7b). The plug connector 132 has an outer contour 41, which at two corners has chamfers 144, visible in the frontal representation shown on the right, which ensure that the plug connector is not inserted with incorrect polarity in the socket 134. For this purpose, the socket 134 has an inner contour 142 that likewise has matching chamfers 146.

As a holding means that holds the plug connector 132 and the socket 134 together with a defined force, the plug connector 132 and the socket 134 each have a respective magnet 136, 138, which are poled in such a manner that they attract mutually. In the exemplary embodiment of FIG. 7, these magnets have a rectangular cross section, having a rectangular cavity in the centre. However, there may also be a plurality of magnets, distributed in the surface area of the two components.

For the purpose of producing the electrical contact, the plug connector 132 and the socket 134 each have respective contact surfaces 148, 150, which contact their respective counterpart. For safety reasons, the contact surfaces 148 in the plug connector 132 in this case are set back relative to a front face of the plug connector 132, while the contact surfaces 150 of the socket are arranged so as to protrude relative to a front face of the socket 134. This choice, of realizing the plug connector 132 as a "female" plug connector, prevents the contact surfaces 148 of the plug connector 132 from coming into contact with other conductive objects in the wind turbine in the event of the plug-in connection 130 separating because of slackening of a bolt nut.

All stated features, including the features given solely by the drawings and individual features that are disclosed in combination with other features, are considered to be essential for the invention, singly and in combination. Embodiments according to the invention may be fulfilled by individual features or a combination of a plurality of features. Features that are characterized by "in particular" or "preferably" are to be understood as optional features within the scope of the invention.

LIST OF REFERENCES 1 nacelle
2 rotor hub
3 rotor-blade bearing
3' bore
4 rotor blade
5 flange
6 bearing assembly of the low-speed rotor shaft
7 gearbox
8 generator
9 control electronics with converter
10 mainframe
11 rear frame
12 yaw rive
13 yaw brake
14 lightning protector
15 tower
16 anemometer
20 bolt nut
22 bolt
90 monitoring body
91 nut attachment
92 bolt receiving part
93 locking element
94 mount for contacting and printed circuit board
95 holding structure
96 electrical conductor
97 snap ring
98 predetermined rupture point
99 cabling
99a LED
99' plug-in connection
100 connecting cable
102 connection interruption
110 plug-in connection
112 plug connector
114 socket
116 key
118 slot
120 plug-in connection
122 plug connector
124 socket
126 key
128 slot
130 magnetic plug-in connection
132 plug connector
134 socket
136 magnet
138 magnet
140 outer contour
142 inner contour
144 chamfer
146 chamfer
148 contact surface
150 contact surface

The invention claimed is:

1. A system for monitoring a flange connection of a wind turbine, comprising:
a plurality of bolts that are arranged adjacently to each other in openings of a flange and that are fastened with bolt nuts and/or bolt heads; and
a plurality of monitoring bodies, which are mounted adjacent to each other in positive-locking and/or non-positive locking contact on the bolt nuts and/or the bolt heads of the plurality of bolts, the monitoring bodies being connected to each other, via connecting cables, to form a series circuit;
wherein arrangement of the monitoring bodies on the bolt nuts and/or the bolt heads and the length of the connecting cables are selected such that, upon a sufficient slackening rotation of one of said bolt nuts or bolt heads and of the monitoring body mounted thereon, at least one connecting cable connected to the monitoring body mounted to the slackeningly rotating bolt nut or bolt head becomes detached due to a tensile stress limit value on the connecting cable being exceeded, and
wherein the connecting cables are connectable, or are connected, by means of plug-and-socket connectors in the connecting cables or on the monitoring bodies, said plug-and-socket connectors being configured to separate as axial tensile stress increases and thereby signal a fault in the flange connection.

2. The system according to claim 1, wherein each monitoring body is configured such that, in an event of damage to or destruction of the bolt nut or the bolt head to which each monitoring body is mounted, the monitoring body mounted on the bolt nut or on the bolt head is also damaged, wherein each monitoring body has a sensor that is configured to ascertain a structural integrity of the monitoring body, and wherein the connecting cables between the monitoring bodies interconnect the sensors on the monitoring bodies.

3. The according to claim 1, wherein the connecting cables are installed without tensile force, as long as no bolt nut or bolt head slackens.

4. The system according to claim 1, wherein the slackening rotation of one of the bolt nuts or the bolt heads relative to an initial position of said slackening bolt nut or bolt head is not sufficient to detach the connecting cable until the slackening rotation exceeds 70° relative to the initial portion of said slacking bolt nut or bolt head.

5. The system according to claim 1, wherein the connecting cables are provided with a predetermined rupture point.

6. The system according to claim 2, wherein the plug-and-socket connectors are on the one or more sensors on the monitoring bodies.

7. The system according to claim 1, wherein the plug-and-socket connectors have key-and-slot connections or magnetic connections that separate non-destructively upon the tensile stress limit value being exceeded.

8. The system according to claim 1, wherein, upon the sufficient slackening rotation of one of the bolt nuts or bolt heads, the connecting cables connected to the monitoring body of the rotating bolt nut or bolt head and/or a sensor connected to two adjacent monitoring bodies become detached.

9. The system according to claim 1, wherein the connecting cables are longer than a minimum length between adjacent monitoring bodies.

10. A wind turbine comprising a system for monitoring a flange connection according to claim 1.

11. A method for monitoring a flange connection of a wind turbine, comprising:

mounting a plurality of monitoring bodies, one each, on a plurality of bolt nuts and/or bolt heads of at least one flange connection of a wind turbine;

connecting the plurality of monitoring bodies in a series circuit by means of connecting cables such that, upon a sufficient slackening rotation of one of the plurality of bolt nuts or bolt heads and of the monitoring body mounted thereon, at least one of the connecting cables connected to the monitoring body mounted on the slackeningly rotating bolt nut or bolt head becomes detached due to a tensile stress limit value on the connecting cable being exceeded; and signaling a fault in the flange connection upon detachment of the monitoring body;

wherein the connecting cables are connectable, or are connected, by means of plug-and-socket connectors in the connecting cables or on the monitoring bodies, said plug-and-socket connectors being configured to separate as axial tensile stress increases and thereby signal the fault in the flange connection.

12. The method according to claim 11, wherein structural integrity of the monitoring bodies is monitored by means of one or more sensors on the monitoring bodies, and a fault in the flange connection is signaled in the event of damage to or destruction of one or more of the plurality of monitoring bodies.

13. The method according to claim 11, further comprising shutting down the wind turbine upon the signaling of the fault in the flange connection.

14. The method according to claim 11, wherein the plurality of mounting bodies are connected in several groups of series circuits.

15. The method according to claim 12, wherein, in the event of damage to or destruction of one of the plurality of monitoring bodies, or in the event of detachment of one of the plurality of connecting cables, at least one sensor emits a signal, or wherein damage is determined on the basis of at least one sensor not being identified because of a disconnection of an electrical conductor associated with the at least one sensor or a continuously present signal is interrupted.

* * * * *